E. A. CLARK.
BEATER.
APPLICATION FILED FEB. 28, 1913.
1,167,336.
Patented Jan. 4, 1916.
2 SHEETS—SHEET 1.
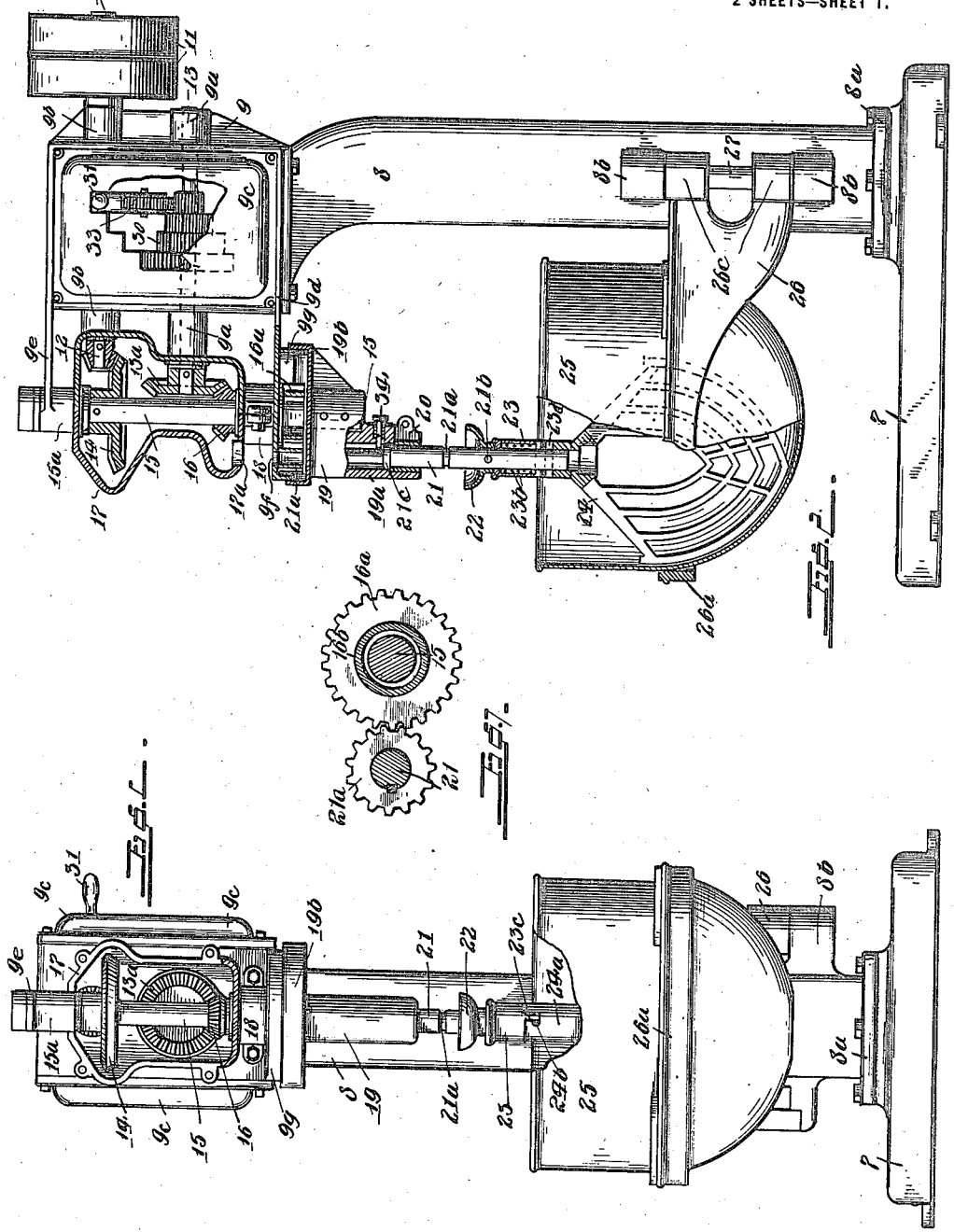

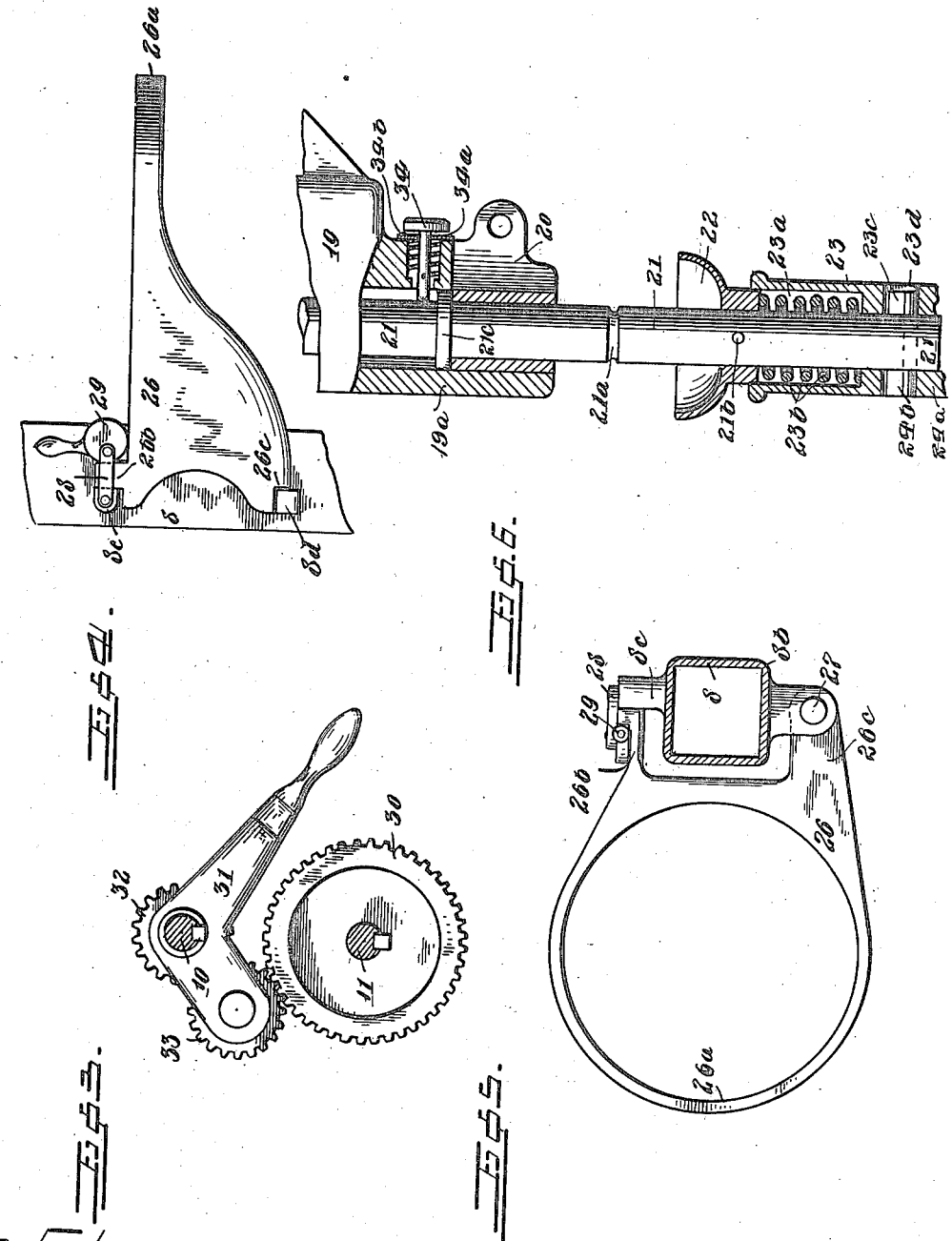

UNITED STATES PATENT OFFICE.

ELMER A. CLARK, OF JOLIET, ILLINOIS.

BEATER.

1,167,336.  Specification of Letters Patent.  Patented Jan. 4, 1916.

Application filed February 28, 1913. Serial No. 751,247.

*To all whom it may concern:*

Be it known that I, ELMER A. CLARK, citizen of the United States, residing at Joliet, in the county of Will and State of Illinois, have invented certain new and useful Improvements in Beaters, of which the following is a specification.

This invention relates to improvements in the class of beating, mixing or stirring machines that is especially adapted for use in bakeries in the preparation of cake materials, where the quantities of ingredients are relatively large and the resultant mass of considerable volume, and where it becomes desirable to perform the operations effectively in a short time.

The object of the improvements which I have invented, and which will be hereinafter described in detail, is to produce a machine of the type described, of simple, strong and durable construction and which will be convenient in use.

A further object is to provide a mechanical movement which will rotate the beater member or whip rapidly about its shaft, and at the same time drive it slowly around the interior of the vessel, thus giving the beater a compound movement which will render it most efficient as a mixing device.

A further object is to so arrange and operate the mechanisms employed, that the whip may be quickly and easily lifted out of the mass of materials in the bowl without danger of spilling or splashing the contents.

My invention consists in the various details of construction which I have shown in a preferred form in the accompanying drawing, which forms a part of this application for patent, and in the following views, Figure 1 is a front elevation of my improved machine, a portion of the bowl being broken away; Fig. 2 is a view partly in side elevation and partly in section of said machine; Fig. 3 is an enlarged detail of the speed-changing lever; Fig. 4 is an enlarged side elevation of the bowl supporting ring, showing the locking device therefor; Fig. 5 is a top-plan view of the bowl-supporting ring, and Fig. 6 is an enlarged sectional view of the beater shaft and coöperating members. Fig. 7 is a detail of gears.

Referring now to the details of the drawing, 7 represents the base of my machine, to which is bolted through a flange, $8^a$, a standard 8, of hollow rectangular form in cross-section as shown in Fig. 5. To the upper end of the standard is secured a box-like cast-iron casing 9, on which are formed journal bearings $9^a$, $9^b$, horizontal extensions $9^d$, $9^e$, and which is provided with detachable cover plates $9^c$, on opposite sides.

Extending through the casing, and journaled in the bearings $9^d$, is the main drive-shaft 10 which carries the tight and loose pulleys 11. Below the shaft 10, is a second shaft 13, which is journaled in the bearings $9^a$, and is driven from the shaft 10, as will be described.

On the inner end of the shaft 10, is pinned a bevel gear 12, and on the corresponding end of the shaft 13 is secured a bevel gear $13^a$, of a diameter considerably greater than the gear 12. The gear 12 meshes with and drives a bevel gear 14, which is fixed near the upper end of a vertical shaft 15 which is journaled at its upper end in a bearing $15^a$ at the end of the casing extension $9^e$. The bevel pinion $13^a$ meshes with and drives the gear 16 on the upper end of a sleeve $16^b$ which is loosely mounted on the lower portion of the shaft 15, and carries a gear $16^a$ below the shaft collar or bearing 18.

The gears 12, $13^a$, 14 and 16 are inclosed within a 2-piece box 17, through which the shaft 15 extends, and in the bottom wall of which is an opening $17^a$, which registers with a similar opening $9^f$ in the extension $9^d$. The latter has a vertical downwardly extending annular flange $9^g$ which fits within the annular flange $19^b$ on the upper portion of the combined coupling and bearing 19, said flange forming a boxing which incloses the gear $16^a$ on the shaft 15 and a gear $21^a$ which is keyed on the upper end of the whip spindle 21. The spindle 21 passes downwardly through the hollow extension $19^a$ of the bearing 19, through a cup, 22, and a sleeve 23, to the lower end of which is removably secured the whip 24. Near the upper portion of the spindle 21 is an annular collar $21^c$, and below same is an annular groove $21^a$. The cup 22 is secured to the spindle by a pin $21^b$, as best shown in Fig. 6. The sleeve 23 is counterbored in its upper portion to form a recess $23^a$ in which is placed an expansion coil spring $23^b$, one end of which bears against the sleeve and the other end against the cup 22. The sleeve 23 is also formed with a finger $23^c$ projecting downwardly from its lower edge, which normally enters the vertical portion of an angular or bayonet slot 24$^b$ in the upper portion of the hub 24$^a$ of the whip 24. A pin 23$^d$ passes transversely through the spindle 21 and normally projects into the horizontal portion of said slot 24$^b$, thereby holding the beater upon the spindle. If it be desired to disconnect the whip from the spindle, it is only necessary to push the sleeve 23 upwardly against the tension of the springs 23$^b$, and turn the hub 24$^a$ until the pin 23$^d$ registers with the vertical and open portion of said slot 24$^b$, whereupon the whip may be lowered and disconnected.

The whip 24 is of the grid type with its edges conforming to the curvature of the sides of the kettle 25. This kettle is removably supported within the circular rim 26$^a$ of a bracket 26. This bracket is formed with extensions 26$^c$, which provide hinge connections for a pin 27 in the offset bearigs 8$^b$ on one side of the lower portion of the standard 8. The opposite side of the bracket 26 has an extension 26$^b$, the end of which terminates in a hook which engages a lug 8$^c$ on the corresponding side of the standard when the bracket is in operative position, and is locked in such position by a latch consisting of a link 28 pivoted on the lug 8$^c$, and carrying at its free end a cam 29, as shown in Figs. 4 and 5. The bracket is also provided with a notch 26$^e$ in the lower corner of its free end, which engages a corresponding lug 8$^d$ on the standard 8, and thus serves to support the bracket against downward and rearward thrust resulting from the weight of the kettle 25 and its contents.

The shaft 13 carries a series of pinions 30 of different diameters, which are housed within the casing 9. The shaft 10 carries a crank-arm lever 31, in which is mounted a pinion 33 which is in mesh with a pinion 32 on the shaft 10. By raising or lowering the lever 31, the pinion 33 may be thrown in mesh with any one of the gears 30 and thus changing the speed of the shaft 13 and its bevel gear 13$^a$ and the gears 16, 16$^a$.

In a suitable opening at one side of the casting 19, is inserted a pin 34, the inner end of which presses against the spindle 21 through the expansion of a coil spring 34$^b$ one end of which is secured to the pin and the other end bears against a plate 34$^a$ which is secured over said opening. Normally the pin 34 is above the shoulder 21$^c$, as shown in Fig. 6, but if it be desired to raise or push upwardly the spindle 21, the pin 34 is pulled outwardly until its inner end clears the shoulder, whereupon the spindle may be raised until the groove 21$^a$ is opposite the pin, and the latter will engage the groove and hold the spindle in its raised position. This elevation of the spindle permits the whip 24 to be easily removed from the kettle when disconnected at the bayonet joint above described.

The vertical movement of the spindle 21, is permitted by the opening 9$^f$ in the extension plate 9$^d$ and the sliding connection between the gear 21$^a$ and the spindle, it being understood that while the gear is splined on the spindle as shown in Fig. 7, there is a sliding fit.

As the hub 16$^b$ of the bevel gear 16 is pinned to the casing or boxing 19, the latter will rotate with said gear, and carry with it the spindle 21 which is arranged eccentrically in respect to the kettle. As the gear 16 meshes with the pinion 21$^a$ on the spindle 21, the latter will be rotated on its axis and thus impart rotary motion to the whip.

The kettle supporting means described permits the kettle to be readily lifted out of the bracket ring 26$^a$, and also permits the bracket to be swung around on the pivotal axis represented by the pintle 27 and its bearings 8$^b$.

The cup 22 will catch any oil that might leak from the casing 19, and thus prevents possible contamination of the contents of the kettle.

It will be obvious that the arrangemennt of gearing described provides for relatively low speed for the whip in its travel around the sides of the kettle, and high speed for the rotation of the whip on its vertical axis, which results in the most effective manipulation of the contents of the kettle. The quick and easy detachment of the whip from the spindle, made possible by the construction shown, not only facilitates its removal from the material in the kettle without spilling or slopping the contents of the latter, but also enables changes to be made in the whips without disturbing or disconnecting other parts of the mechanism.

Having thus described my invention what I claim as new and desire to secure by Letters Patent, is:—

In a beater comprising a standard and a kettle mounted thereon, a whip extending into said kettle, means for rotating said whip on its vertical axis, means for bodily moving whip concentric to said kettle, and means for yieldingly connecting said whip to said driving means.

In testimony whereof I affix my signature in the presence of two witnesses.

ELMER A. CLARK.

Witnesses:
 CARL MORTENSON,
 M. A. MILORD.